United States Patent

[111] 3,596,380

[72] Inventor James J. Williams
 2330 S. Pacific, Boise, Idaho 83705
[21] Appl. No. 1,416
[22] Filed Jan. 8, 1970
[45] Patented Aug. 3, 1971

[54] COMBINATION TOY AND EDUCATIONAL APPARATUS
 3 Claims, 7 Drawing Figs.
[52] U.S. Cl. .................................................. 35/77,
 273/155, 273/157
[51] Int. Cl. ..................................................... A63f 9/08
[50] Field of Search .......................................... 273/156,
 160, 155, 157; 35/28, 77

[56] References Cited
UNITED STATES PATENTS
1,050,141  1/1913  Joy............................... 273/156

Primary Examiner—Harland S. Skogquist
Attorney—John W. Kraft

ABSTRACT: The combination toy and educational apparatus of the present invention includes a plurality of annular rings concentrically disposed one within another. The ring elements are each provided with a convex terminal edge portion and an opposing concave terminal edge portion so that the convex edge portion of one ring is engageable with a next succeeding larger concentrically disposed ring. The convex edge portions of the rings are provided with a flat planar surface athwart the edge, while the opposing concave edge portion is provided with a transversely planar receded portion adjacent one of the contiguous faces of the ring. When the planar surfaces of one ring are aligned the recede portion of the next larger concentrically disposed ring, the first ring may be engaged with or removed from the latter ring. Indicia may be printed or embossed upon one of the faces of the rings, which indicia when aligned may form a representation of words or objects for educational purposes.

PATENTED AUG 3 1971 3,596,380

JAMES J. WILLIAMS INVENTOR.

BY John W. Kraft

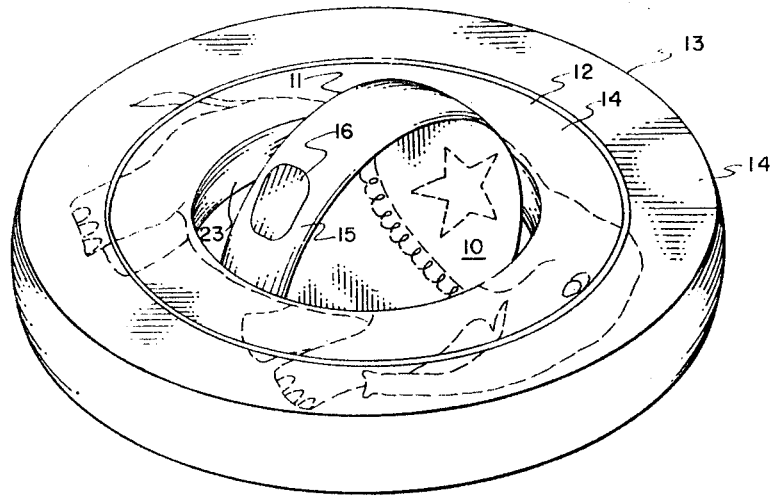
FIG.4
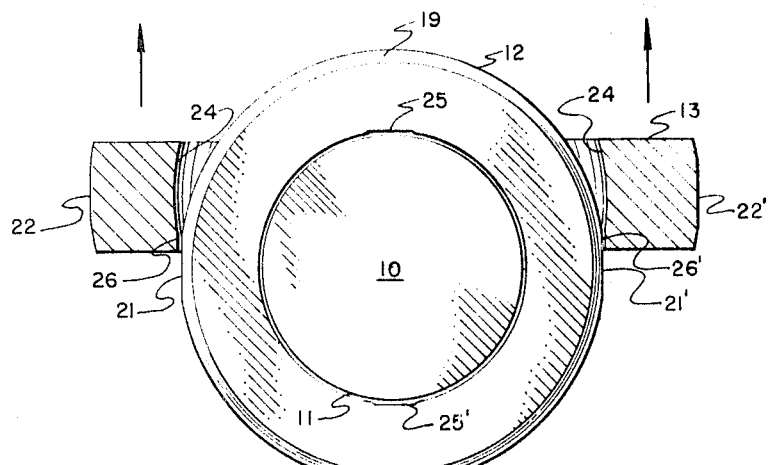
FIG.5
JAMES J. WILLIAMS INVENTOR
BY 

PATENTED AUG 3 1971 3,596,380

JAMES J. WILLIAMS  INVENTOR.

BY 3,596,380

1

COMBINATION TOY AND EDUCATIONAL APPARATUS

FIELD OF INVENTION

The present invention relates to combination toy and educational apparatus, and more particularly to combination toy and educational apparatus having a plurality of disclike elements concentrically disposed one about another in which each disclike element is rotatably and pivotally carried by another larger disclike element and including flat opposing forces having indicia thereon which may be planarly oriented to form designs, symbols, characters and the like.

DESCRIPTION OF THE PRIOR ART

Concentrically disposed ringlike elements used for jewelry and formerly known in the art generally are provided with a studlike projection in one of the elements which is frictionally seated into a mating recessed portion of another larger element so that the one element is pivotally mounting in the other element. A pin extending through each of the concentric ringlike elements is sometimes frictionally pressed into mating holes of the respective elements to hold them in place and to provide an axis for pivotal movement between them.

In the manufacture of toys, puzzles and educational applicances employing concentrically disposed ringlike elements have been variously joined together by means of alignment of slotlike openings in adjacent ringlike elements and by means of collapsible joints in each of the elements wherein the elements are rotatably joined together by means of a shank or similar projection travelling in a corresponding channellike grooves in the respective elements.

In each of the apparatus above described, movement of respective concentrically disposed elements are limited to one directional movement. That is to say the respective elements may be made to have either rotational or pivotal movement, but usually not both. In addition, the construction of such apparatus generally does not include means by which the elements may be easily assembled and disassembled.

Accordingly, it is an extremely important object of the present invention to provide means by which the concentrically disposed elements of a combination toy and educational apparatus may be rotatably and pivotally moved, and to provide means by which the several elements may be easily assembled and disassembled from one another.

A further object of the present invention is to provide an educational apparatus having flat opposing faces carrying a variety of indicia thereon which when planarly oriented with indicia on associated elements may form designs, symbols or characters on the respective faces.

Another object of the present invention is to provide in the elements means by which the elements may be used as toy construction modules and means to form a spinning top.

Generally the combination toy and educational apparatus here disclosed comprises a disclike element and a plurality of ringlike elements, each of which are concentrically disposed. Each of the elements is rotatably and pivotally carried by the next larger concentric element. An outer convex terminal edge of one element is intended to be in operative engagement with an inner concave terminal edge of the next succeeding element. The apparatus may be assembled and disassembled by pivotally turning one element vertically 90° with respect to the next succeeding element, aligning flat segment portions provided on the outer convex terminal edges of the element with relieved portions provided on one of the terminii of the inner concave terminal edges of the next contiguous element, and then joining or separating the respective elements.

A more thorough and comprehensive understanding may be had from the detailed description following when read in connection with the drawings herein:

2

Figures 2, 3:
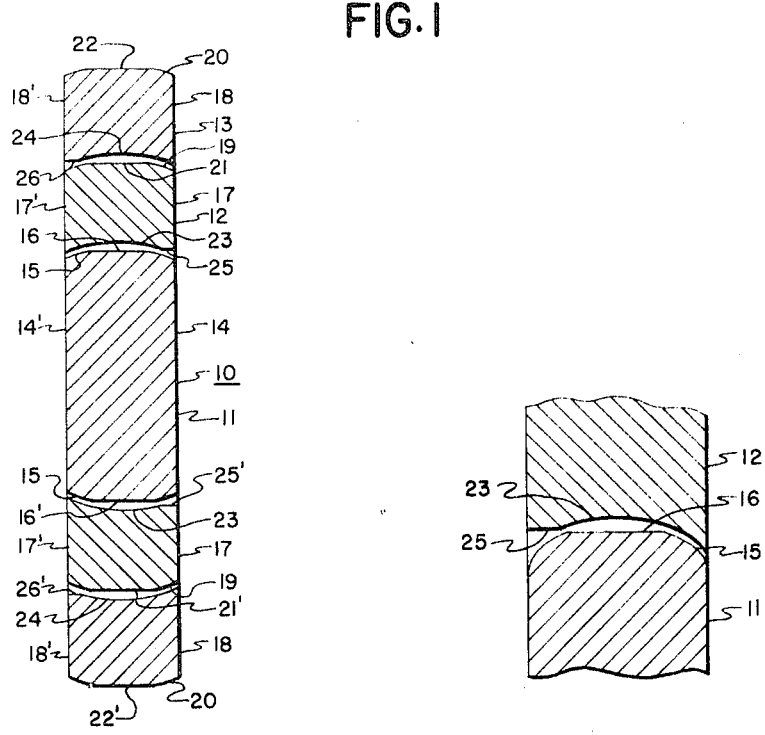
FIG. 2 is a cross section elevational view of the invention showing the terminal edges of the several elements.
Figure 6:
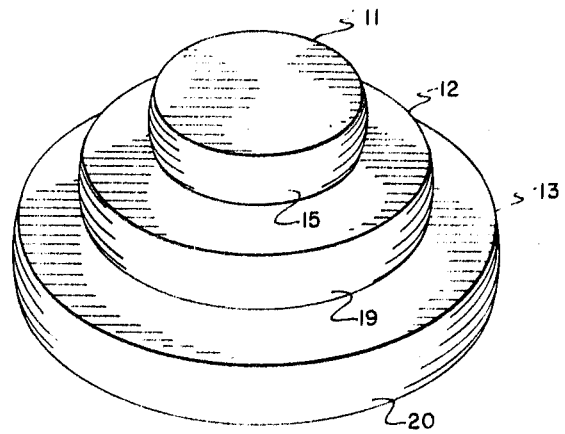
Figure 7:
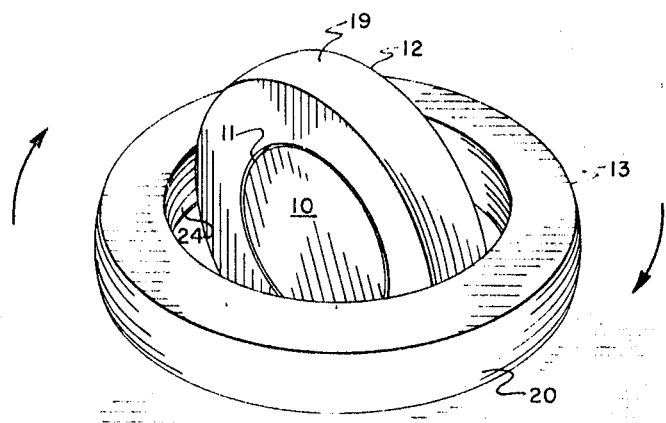

FIG. 3 is a fragmentary cross section elevation view of two of the elements drawn to a larger scale and showing the flat segment portion of one element associated with the relieved portion of the convex terminal edge of the next succeeding element;

FIG. 4 is a perspective view of the apparatus showing one of the elements pivoted in another element, while a third element is shown planarly rotated with the other element;

FIG. 5 is an elevational view with one of the elements shown in cross section and indicates the manner of assembly and disassembly of the elements;

FIG. 6 is a perspective view of the elements of this invention showing a toy construction building modules;

FIG. 7 is a perspective view of this apparatus showing the elements thereof oriented to form a spinning top.

DETAILED DESCRIPTION OF THE PREFERRED EMBODIMENT

Figure 1:
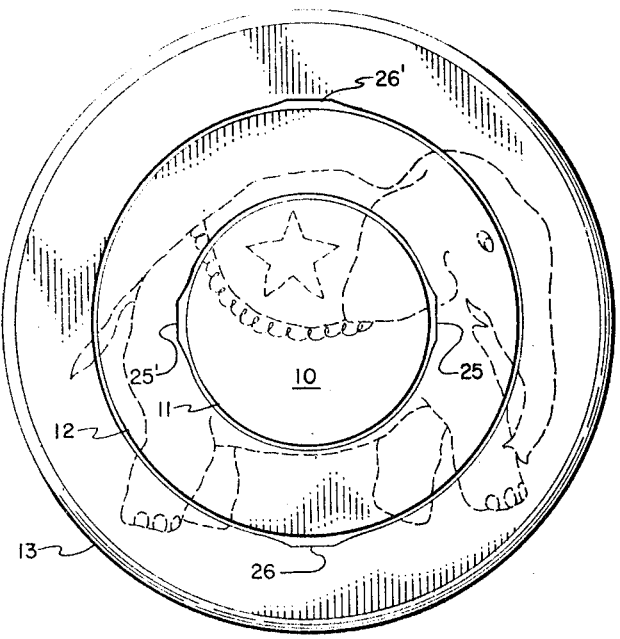
FIG. 1 is a plan view of the combination toy and educational apparatus of the present invention showing the concentrically disposed elements assembled together.

Referring now to the drawings, the combination toy and educational apparatus of the present invention is generally shown and identified by the numeral 10 in FIG. 1. The apparatus 10 comprises a flat disclike element 11 and a plurality of concentrically arranged flat ringlike elements 12 and 13. Any number of adjacent concentric ringlike elements may be used in association with each other in an apparatus 10. The elements 11, 12 and 13 are respectively contiguously and concentrically disposed. The cross section elevational view of FIG. 2 shows to advantage the terminal edges of elements 11, 12 and 13.

The disclike element 11 includes flat opposing faces 14 and 14', and a substantially convex-shaped circumferential outer terminal edge 15. The edge 15 of element 11 is provided with a pair of opposing, substantially flat segment portions 16 and 16', shown to advantage in FIGS. 2, 3 and 4. The portions 16 and 16' of the element 11 intersect the terminal edge 15 in a tangental plane, the centralmost portion being substantially equidistant between the outermost peripheral surface thereof and a plane formed by the respective terminii of edge 15.

The ringlike elements 12 and 13 have respective flat opposing faces 17, 17' and 18, 18'. One of the terminal edges of each of the elements 12 and 13 is substantially convex. The convex edges of the elements 12 and 13 are identified by the numerals 19 and 20, respectively, and in the embodiment shown and described may be referred to as the outer convex edges 19 and 20. It is to be understood that the convex edges 15, 19 and 20 of the respective elements 11, 12 and 13 may be made concave where the opposing inner concave edges of the ringlike elements 12 and 13, hereinafter later described, are made convex in an apparatus 10. The edges 19 and 20 are each provided with a pair of opposing, substantially flat segment portions 21, 21' and 22, 22', shown to advantage in FIGS. 2 and 6. The portions 21, 21' and 22, 22' of the respective elements 12 and 13 intersect the respective terminal edges 19 and 20 in a tangental plane, the centralmost portion being substantially equidistant between the outermost peripheral surface thereof and a plane formed by the respective terminii of each of the edges 19 and 20.

The terminal edges of ringlike elements 12 and 13 which are opposite respective outer convex edges 19 and 20, are substantially concave, and are identified by the numerals 23 and 24, respectively, in the drawings. Hence, the ringlike element 12 may be rotatably and pivotally carried by the larger, concentrically disposed, ringlike element 13 when the elements 12 and 13 are assembled. Similarly, the disclike element 11 may be rotatably and pivotally carried by the larger, concentrically disposed ringlike element 12 when assembled.

The concave edges 23 and 24 are each provided with a pair of planarly opposing relieved portions 25, 25' and 26, 26', respectively. The relieved portion 25, 25' and 26, 26' are disposed on one of the faces of respective elements 12 and 13 at the junction between the terminii of the edge and the face.

Referring particularly to FIG. 5, assembly and disassembly of ringlike elements 12 and 13 may be accomplished by pivotally turning one element vertically 90° with respect to the other, aligning the flat segment portions 21 and 21' of element 12 with the relived portions 26 and 26', and then joining or separating the elements 12 and 13. Similarly, the assembly or disassembly of disclike element 11 and ringlike element 12 may be accomplished by pivotally turning one of the elements vertically 90° with respect to the other, aligning the flat segment portions 16 and 16' of the element 11 with the relieved portions 25 and 25' of the element 12, joining or separating the respective elements.

In practice the apparatus 10 has been found to have substantial advantage as an educational appliance. For example in teaching braille to the blind it has been found that sets of apparatus 10 and having interchangeable elements 11, 12, and 13 and having different indicia embossed upon the respective faces of each of the several elements 11, 12 and 13 so as to form different words when the elements are interchangeably assembled and oriented accelerates the learning process. For those persons who have the fortune of sight, puzzle-forming line indicia may be printed or embossed upon each of the faces of the elements 11, 12 and 13 which indicia, when planarly oriented with each other forms a design or characters. FIGS. 1 and 4 show to advantage indicia in dotted lines planarly oriented to form the character of an elephant. By pivotally rotating the several elements such as shown by the element 11 in FIG. 4, different indicia on the opposite face when planarly oriented with the indicia on face 14 shown may change the character to another. In this manner combinations of indicia on each of the faces may be made to form a variety of designs and characters.

It has also been found that by friction fitting the several elements together as shown to advantage in FIG. 6, that toy construction modules may be formed by the elements 11, 12 and 13. A variety of toy construction configurations may be achieved by interchangeably orienting the several elements of a multiplicity of apparatus 10.

In the assembly shown to advantage in FIG. 7 where the elements 11 and 12 are disposed at 90° to the element 13, and the element 12 is frictionally engaged with the element 13, the apparatus 10 is made to form a spinning top toy. It is to be understood that the element 11 may be disposed at 90° to the elements 12 and 13, and be frictionally engaged with the element 12 to form a spinning top toy.

The apparatus 10 has been found useful when adapted for use with jewelry such as earrings, pendants, tie clasps and the like. In such environments the element 13 is hung by a ringlike connector to the base finding. Since the use in such an environment appears obvious further description and drawings appear unnecessary.

Having thus described a preferred embodiment of the invention which embodies the teaching and principles of my invention therefor, it is to be appreciated and will be apparent to those skilled in the art that many physical changes could be made on the invention without altering the inventive concepts embodied therein. Hence, it is intended that the scope of the invention be limited only to the extent indicated by the appended claims.

I claim:

1. A combination toy and educational apparatus comprising a plurality of annular ring elements including opposing flat planar faces, said ring elements being concentrically disposed one within another, each of said ring elements having a convex terminal edge portion about the periphery thereof and an opposing concave terminal edge portion, a pair of opposing flat planar surfaces athwart said convex terminal edge portion, a pair of opposing transversely planar recede portions on one of the faces of said annular rings contiguous with the intersection of said concave terminal edge and said face, one of said annular ring elements being operable to be engageable with and removable from a concentrically disposed larger adjacent ring element by alignment of said opposing flat planar surfaces athwart said convex terminal edge portion of said first ring with said opposing transversely planar recede portions of said concentrically disposed larger adjacent ring element.

2. The apparatus of claim 1 including indicia arranged on one of the planar faces of said ring elements, said ring elements being operable to be moved about respective axis thereof so that said indicia may be aligned to form a pattern or pictorial representation.

3. The apparatus of claim 2 wherein said indicia are embossed upon said face, said embossed indicia being operable to be aligned and arranged for the teaching of braille.